(12) United States Patent
Komatsu et al.

(10) Patent No.: US 12,741,500 B2
(45) Date of Patent: Sep. 22, 2026

(54) VEHICLE

(71) Applicant: HONDA MOTOR CO., LTD., Tokyo (JP)

(72) Inventors: Daigo Komatsu, Tokyo (JP); Koki Nakajima, Tokyo (JP); Motoi Shioaku, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 309 days.

(21) Appl. No.: 18/584,674

(22) Filed: Feb. 22, 2024

(65) Prior Publication Data

US 2024/0308393 A1 Sep. 19, 2024

(30) Foreign Application Priority Data

Mar. 13, 2023 (JP) ................................ 2023-039072

(51) Int. Cl.
*B60H 1/00* (2006.01)
*B60L 50/60* (2019.01)
(Continued)

(52) U.S. Cl.
CPC .......... *B60H 1/00278* (2013.01); *B60L 50/66* (2019.02); *B60N 2/06* (2013.01);
(Continued)

(58) Field of Classification Search
CPC .......... B60H 1/00278; B60K 2001/005; B60K 2001/0433; B60L 50/66; B60R 13/0273; B62D 25/20
See application file for complete search history.

(56) References Cited

U.S. PATENT DOCUMENTS 6,931,878 B2 * 8/2005 Kubota .................. B60L 50/64 62/244
7,396,075 B2 * 7/2008 Ohkuma ................. B60N 2/36 297/15
(Continued)

FOREIGN PATENT DOCUMENTS

DE 102013223667 A1 * 5/2014 ............... B60K 1/04
JP 2002219949 A * 8/2002
(Continued)

OTHER PUBLICATIONS

Oct. 22, 2024, Translation of Japanese Office Action issued for related JP Application No. 2023-039072.

*Primary Examiner* — Jason S Morrow
(74) *Attorney, Agent, or Firm* — Paratus Law Group, PLLC

(57) ABSTRACT

A vehicle includes: a floor panel; a seat rail extending in a front-rear direction; a movable member engaged with the seat rail in a manner slidable in the front-rear direction; a seat supported by the movable member; a battery pack disposed behind the seat; an intake duct having an intake port and configured to supply air taken in from the intake port to the battery pack; and a wheel house, wherein the seat rail is separated upward from the floor panel, the intake port is at least partially positioned between the floor panel and the seat rail in an upper-lower direction, the wheel house includes a side wall extending in the front-rear direction and a fender extending outward in the vehicle width direction, and the intake port is at least partially positioned in front of a front end of the side wall of the wheel house.

5 Claims, 7 Drawing Sheets

(51) Int. Cl.

| | |
|---|---|
| ***B60N 2/06*** | (2006.01) |
| ***B60R 13/02*** | (2006.01) |
| ***B62D 25/16*** | (2006.01) |
| ***B62D 25/20*** | (2006.01) |
| *B60K 11/08* | (2006.01) |

(52) U.S. Cl.

CPC .......... *B60R 13/0237* (2013.01); *B62D 25/16* (2013.01); *B62D 25/20* (2013.01); *B60H 2001/003* (2013.01); *B60K 11/08* (2013.01)

(56) References Cited

U.S. PATENT DOCUMENTS

| | | | | |
|---|---|---|---|---|
| 7,654,351 | B2 * | 2/2010 | Koike | H01M 50/278 180/68.5 |
| 7,733,065 | B2 * | 6/2010 | Yoon | B60L 50/60 429/82 |
| 7,905,307 | B2 * | 3/2011 | Kubota | H01M 10/6566 180/68.1 |
| 9,067,486 | B2 * | 6/2015 | Janarthanam | H01M 50/249 |
| 9,126,477 | B2 * | 9/2015 | Zhu | B60N 2/646 |
| 9,160,042 | B2 * | 10/2015 | Fujii | H01M 10/625 |
| 10,118,459 | B2 * | 11/2018 | Yasuda | B60L 50/64 |
| 2013/0092348 | A1 | 4/2013 | Bito | |
| 2018/0015806 | A1 | 1/2018 | Yasuda et al. | |
| 2022/0126668 | A1 | 4/2022 | Komatsu | |
| 2024/0308394 | A1 * | 9/2024 | Takai | B60N 3/042 |

FOREIGN PATENT DOCUMENTS

| | | | | | |
|---|---|---|---|---|---|
| JP | 2006335244 | A | * | 12/2006 | |
| JP | 2013-086539 | A | | 5/2013 | |
| JP | 2014084044 | A | * | 5/2014 | |
| JP | 2020117110 | A | * | 8/2020 | B60L 50/64 |
| JP | 2022-071679 | A | | 5/2022 | |
| WO | WO 2013/077003 | A1 | | 5/2013 | |
| WO | WO 2016/125388 | A1 | | 8/2016 | |

* cited by examiner 22a
4a
22
V
4
12(F)
18
5
5a
A
18
11
22
13
17L(17)
14(F)
A
3
1
17R(17)
Fr
R
Rr
L U
D
Fr
Rr
13
1
14(F)
3
2
2
14a
5
5a
15(F)
CP
12(F)
17R
18
171
11

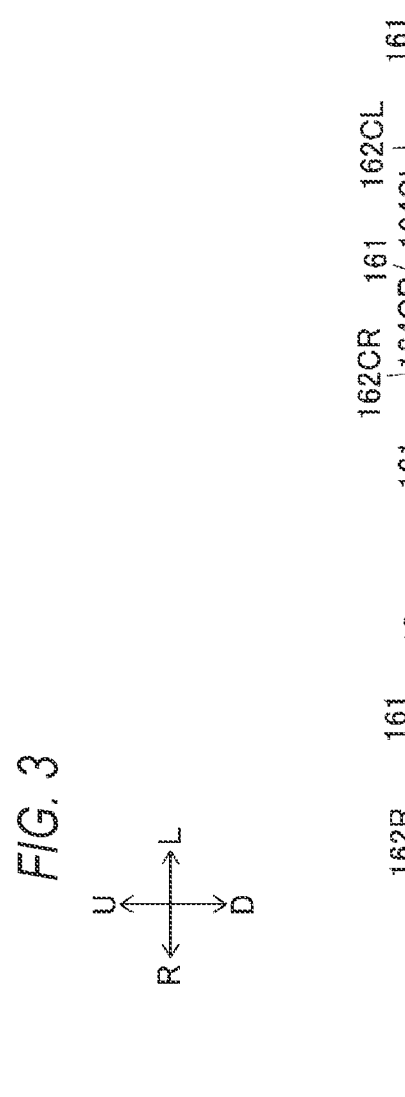
FIG. 3
U
L
D
R
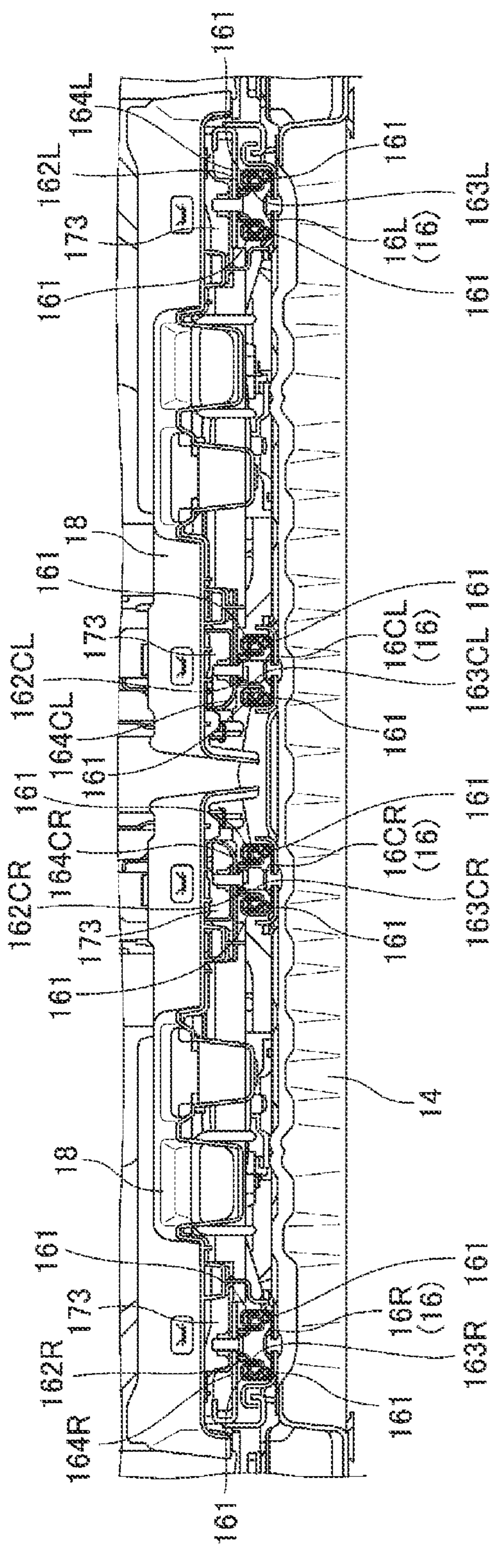
161
164L
162L
173
161
163L
16L
(16)
18
162CL
164CL
16CL
(16)
163CL
164CR
162CR
16CR
(16)
163CR
14
162R
164R
16R
(16)
163R U
D
L
Fr
Rr
R
17
17L
17R
171
172
173
174L
174R
18
16R U
R
L
D
17R
22
172
221
171
162R
16R
F
4a
4

VEHICLE

CROSS-REFERENCE TO RELATED APPLICATIONS

This application is based on and claims priority under 35 USC 119 from Japanese Patent Application No. 2023-039072 filed on Mar. 13, 2023, the entire content of which is incorporated herein by reference.

TECHNICAL FIELD

The present invention relates to a vehicle. The present invention particularly relates to a vehicle equipped with a battery pack.

BACKGROUND ART

In recent years, researches and developments have been conducted on an electric vehicle which contributes to improvement in energy efficiency in order to allow more people to have access to affordable, reliable, sustainable and advanced energy. The electric vehicle is equipped with a battery pack, and the electric vehicle can travel with power of a drive motor driven by electric power stored in the battery pack.

JP2013-86539A discloses a vehicle in which a battery pack is disposed behind a rear seat and an intake duct is disposed under the rear seat. In the vehicle described in JP2013-86539A, the intake duct has a rear end connected to the battery pack behind the rear seat and a front end located in a front portion of the rear seat. The front end has an opening that opens forward.

SUMMARY OF INVENTION

However, in the vehicle described in JP2013-86539A, air flows in the intake duct from the opening in the front portion of the rear seat to the rear of the rear seat. Therefore, the flow path length of the air in the intake duct is large.

If the flow path length of the air in the intake duct is large, the pressure loss of the air supplied to the battery pack increases, which increases the manufacturing cost and the weight.

The present invention provides a vehicle that can shorten the flow path length of air in an intake duct and can more reliably take in more air in the front portion of the passenger compartment from an intake port. This further contributes to improvement in energy efficiency. According to the present invention, it is possible to shorten the flow path length of air in an intake duct and more reliably take in more air in the front portion of the passenger compartment from an intake port.

BRIEF DESCRIPTION OF DRAWINGS

FIG. 3 is a cross-sectional view of a main part near a seat rail in FIG. 1.

DESCRIPTION OF EMBODIMENTS

Figure 1:
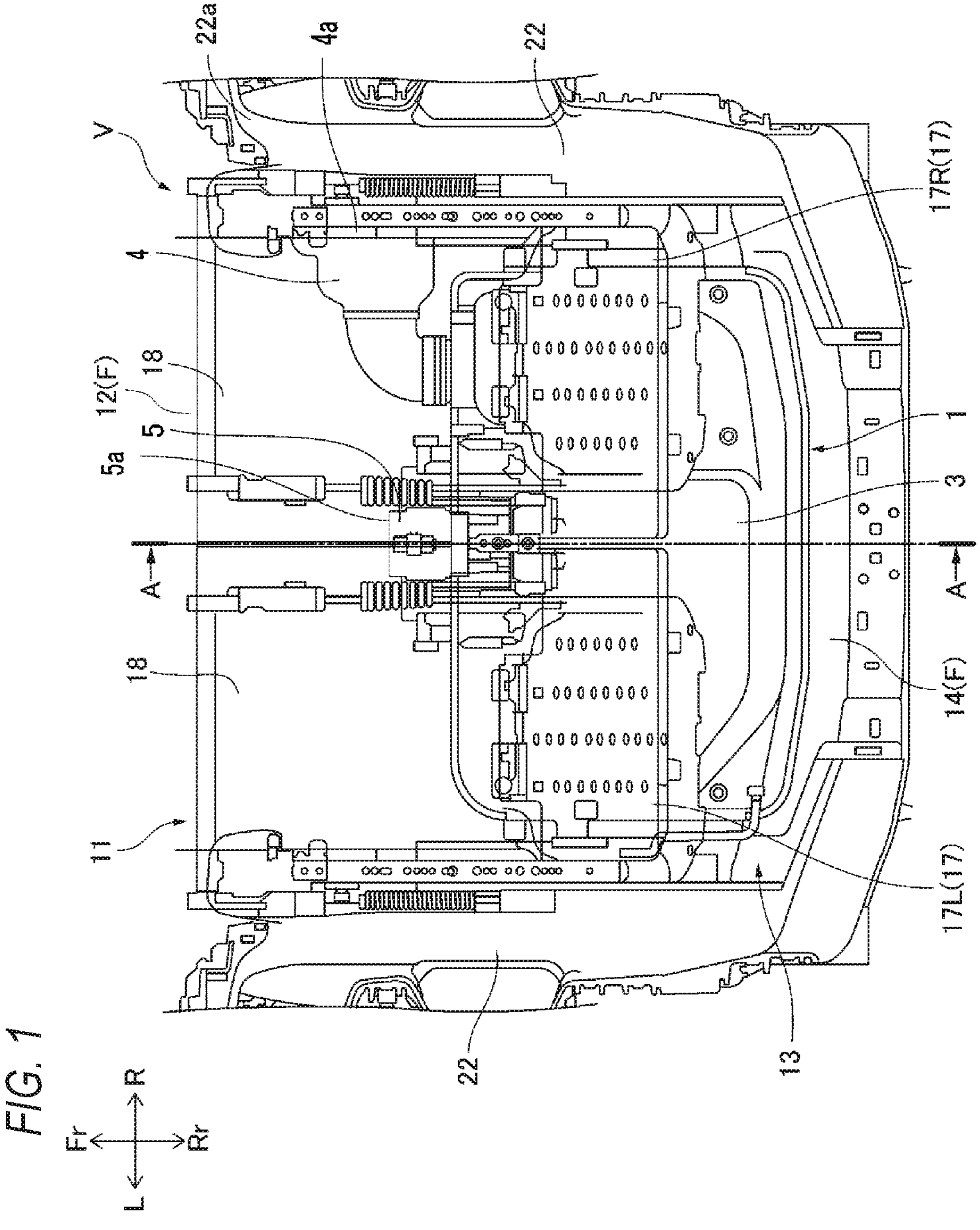
FIG. 1 is a plan view illustrating a rear portion of a passenger compartment and a luggage compartment of a vehicle according to an embodiment of the present invention.

Hereinafter, one embodiment of the present invention will be described with reference to the accompanying drawings. The drawings are to be viewed in the direction of reference signs, and in the following description, front-rear, left-right, and upper-lower directions are referred to as directions seen from a driver, and in the drawings, a front side of the vehicle is illustrated as Fr, rear side as Rr, left side as L, right side as R, upper side as U, and lower side as D.

[Vehicle]

Figure 2:
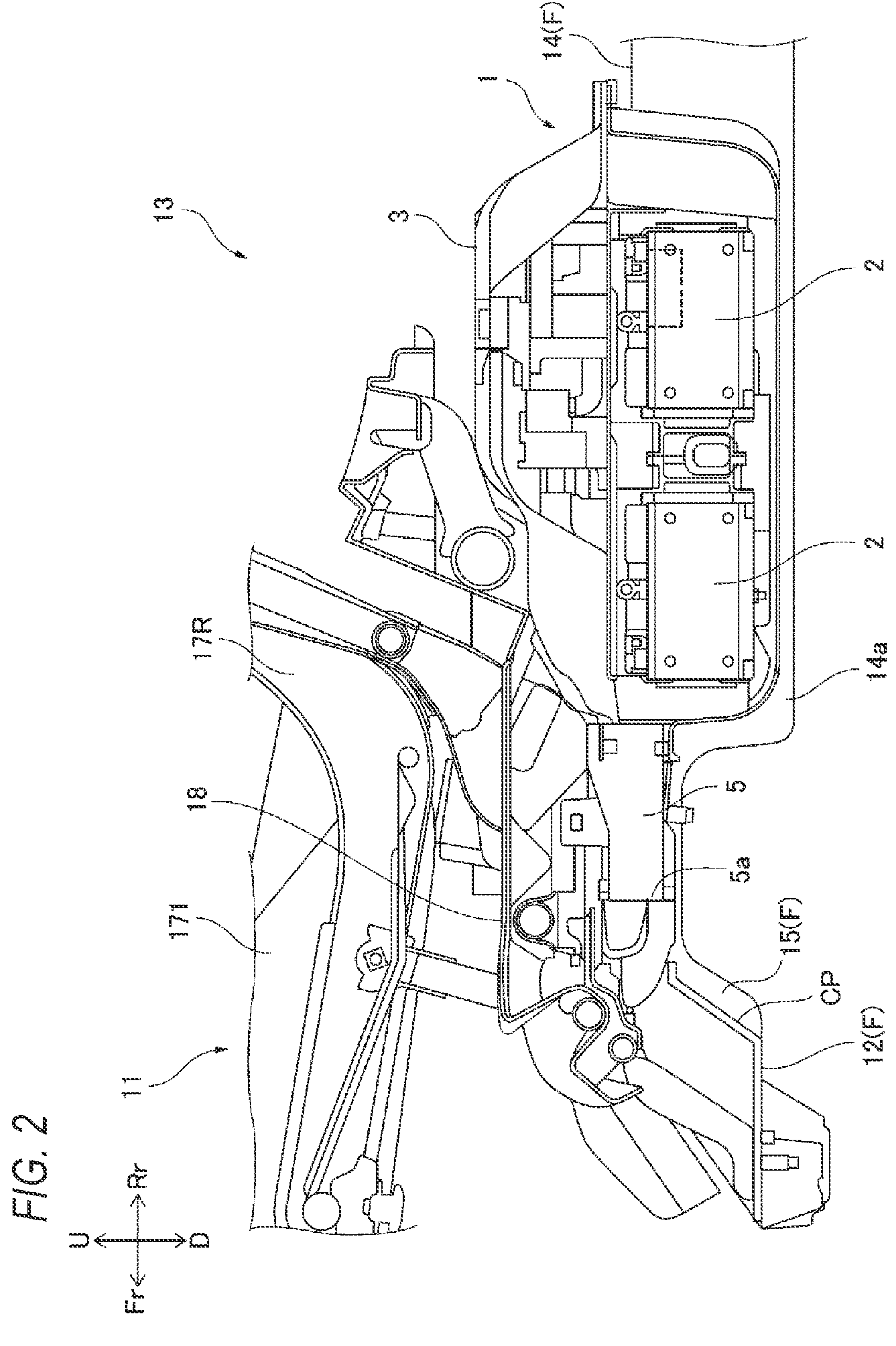
FIG. 2 is a cross-sectional view taken along a line A-A in FIG. 1.
Figure 4:
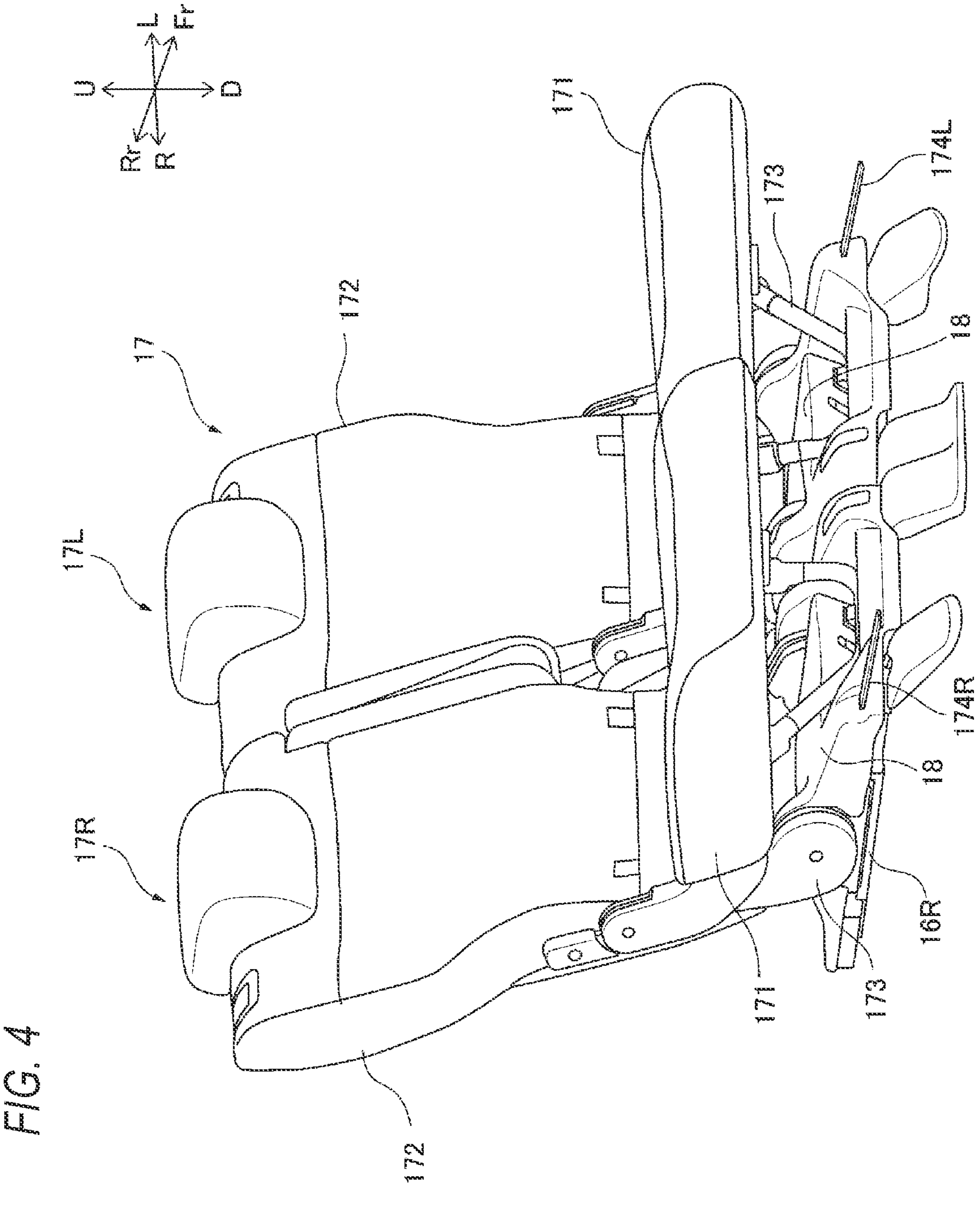
FIG. 4 is a perspective view of a main part near a rear seat and the seat rail.

As illustrated in FIGS. 1 and 2, a battery pack 1 for accommodating a secondary battery (not illustrated) is mounted on a vehicle V of the present embodiment. The vehicle Vis an electric vehicle that can travel by power of a driving motor (not illustrated) driven by the power stored in the battery pack 1.

A floor panel F of the vehicle V includes a front floor panel 12 constituting a floor of a passenger compartment 11, a rear floor panel 14 constituting a floor under a rear seat 17 and a floor of a luggage compartment 13 formed behind the passenger compartment 11, and a kick-up portion 15 which connects the front floor panel 12 and the rear floor panel 14 in a stepped manner.

A center tunnel (not illustrated) is formed in a center portion of the front floor panel 12 in a vehicle width direction along the front-rear direction. The center tunnel is bent such that the front floor panel 12 is upwardly convex, so that a trapezoidal tunnel space is formed therebelow. An exhaust pipe (not illustrated) for discharging exhaust gas from an internal combustion engine to a rear side of the vehicle V or the like is disposed in this tunnel space.

A floor carpet CP is laid on an upper surface of the front floor panel 12.

An accommodating recess **14*a* for accommodating the battery pack 1 is formed in the rear floor panel 14 below the luggage compartment 13, and the battery pack 1 is disposed in the accommodating recess 14*a***.

The battery pack 1 includes the battery module 2, a control device (not illustrated) such as a battery ECU, a cooling component such as a cooling fan, and a battery cover 3. The battery cover 3 covers upper portions of the battery module 2, the control device, and the cooling component. Therefore, the battery module 2, the control device, and the cooling component are accommodated inside a space surrounded by the accommodating recess **14*a* and the battery cover 3**.

An intake duct 4 for supplying air from the passenger compartment 11 to the battery pack 1 is attached at a right side of the battery pack 1. An exhaust duct 5 for discharging air from the battery pack 1 to the passenger compartment 11 outside the battery pack 1 is attached to the front portion of the battery pack 1.

The intake duct 4 extends rightward from the right side of the battery pack 1. The right end of the battery pack 1 is provided with an intake port **4*a* located in the passenger compartment 11 and facing rightward. Details of the intake duct 4** will be described later.

The exhaust duct 5 extends forward from the approximately central part in the left-right direction of the front portion of the battery pack 1. A front end of the exhaust duct 5 is provided with an exhaust port 5*a* positioned inside the passenger compartment 11 and facing forward.

The vehicle V includes the rear seat 17. The rear seat 17 is divided into left and right parts, and includes a left rear seat 17L and a right rear seat 17R. The battery pack 1 is disposed behind the rear seat 17.

A plurality of seat rails 16 extending in the front-rear direction are attached to an upper front portion of the rear floor panel 14. In the present embodiment, four seat rails 16 are attached side by side in the left-right direction. Specifically, the seat rail 16 includes a left seat rail 16L attached near a left end inside the passenger compartment 11, a right seat rail 16R attached near a right end inside the passenger compartment 11, a center left seat rail 16CL attached to a left side of an approximately central part in the left-right direction inside the passenger compartment 11, and a center right seat rail 16CR attached to a right side of the approximately central part in the left-right direction inside the passenger compartment 11.

Each seat rail 16 (left seat rail 16L, right seat rail 16R, center left seat rail 16CL, center right seat rail 16CR) has a substantially rectangular shape with an open upper portion when viewed from the front-rear direction. A plurality of rollers 161 are arranged at four corners of the upper, lower, left, and right sides of each seat rail 16, and are arranged in line at predetermined intervals in the front-rear direction.

The left movable member 162L is engaged with the left seat rail 16L in a manner slidable in the front-rear direction. The left movable member 162L extends in the front-rear direction inside the left seat rail 16L, and includes a slide frame 163L that slides in the front-rear direction by the rollers 161 provided at four corners of the upper, lower, left, and right sides of the left seat rail 16L, and a support frame 164L extending from the slide frame 163L above the opening of the upper portion of the left seat rail 16L and extending in the front-rear direction.

The right movable member 162R is engaged with the right seat rail 16R in a manner slidable in the front-rear direction. The right movable member 162R extends in the front-rear direction inside the right seat rail 16R, and includes a slide frame 163R that slides in the front-rear direction by the rollers 161 provided at four corners of the upper, lower, left, and right sides of the right seat rail 16R, and a support frame 164R extending from the slide frame 163R above the opening of the upper portion of the right seat rail 16R and extending in the front-rear direction.

The center left movable member 162CL is engaged with the center left seat rail 16CL in a manner slidable in the front-rear direction. The center left movable member 162CL extends in the front-rear direction inside the center left seat rail 16CL, and includes a slide frame 163CL that slides in the front-rear direction by the rollers 161 provided at four corners of the upper, lower, left, and right sides of the center left seat rail 16CL, and a support frame 164CL extending from the slide frame 163CL above the opening of the upper portion of the center left seat rail 16CL and extending in the front-rear direction.

The center right movable member 162CR is engaged with the center right seat rail 16CR in a manner slidable in the front-rear direction. The center right movable member 162CR extends in the front-rear direction inside the center right seat rail 16CR, and includes a slide frame 163CR that slides in the front-rear direction by the rollers 161 provided at four corners of the upper, lower, left, and right sides of the center right seat rail 16CR, and a support frame 164CR extending from the slide frame 163CR above the opening of the upper portion of the center right seat rail 16CR and extending in the front-rear direction.

The left rear seat 17L and the right rear seat 17R extend in the front-rear direction and the left-right direction, and each include a seating portion 171 on which an occupant is seated, a backrest 172 positioned at a rear end of the seating portion 171, extending in the upper-lower direction and the left-right direction, and supporting a back of the occupant seated on the seating portion 171, and a seat frame 173 that supports the seating portion 171 and the backrest 172.

The seat frame 173 of the left rear seat 17L is connected to the left movable member 162L and the center left movable member 162CL. The seat frame 173 of the right rear seat 17R is connected to the right movable member 162R and the center right movable member 162CR.

In this way, the left rear seat 17L is supported by the left movable member 162L and the center left movable member 162CL. The right rear seat 17R is supported by the right movable member 162R and the center right movable member 162CR. The left rear seat 17L is slidable in the front-rear direction along the left seat rail 16L and the center left seat rail 16CL together with the left movable member 162L and the center left movable member 162CL. The right rear seat 17R is slidable in the front-rear direction along the right seat rail 16R and the center right seat rail 16CR together with the right movable member 162R and the center right movable member 162CR.

A front strap 174L is attached to a front end of the left movable member 162L or a left front end of the seat frame 173 of the left rear seat 17L. A front strap 174R is attached to a front end of the right movable member 162R or a right front end of the seat frame 173 of the right rear seat 17R. Although not illustrated, a rear strap is attached to a rear end of the left rear seat 17L, and a rear strap is attached to a rear end of the right rear seat 17R. When sliding the left rear seat 17L and the right rear seat 17R forward, the front straps 174L and 174R may be pulled forward to slide the left rear seat 17L and the right rear seat 17R forward. When sliding the left rear seat 17L and the right rear seat 17R rearward, the rear straps may be pulled rearward to slide the left rear seat 17L and the right rear seat 17R rearward.

Under-seat cover members 18 extending in the front-rear direction and the left-right direction are arranged between the seat frame 173 and the seating portion 171 of the left rear seat 17L and between the seat frame 173 and the seating portion 171 of the right rear seat 17R. The left and right under-seat cover members 18 are fixed to the left rear seat 17L and the right rear seat 17R, respectively. The left and right under-seat cover members 18 may be fixed to the left movable member 162L and the center left movable member 162CL, and the right movable member 162R and the center right movable member 162CR, respectively, or may be fixed to the left rear seat 17L, the left movable member 162L, and the center left movable member 162CL, and to the right rear seat 17R, the right movable member 162R, and the center right movable member 162CR, respectively. The left and right under-seat cover members 18 slide in the front-rear direction integrally with the left rear seat 17L and the right rear seat 17R.

The left and right under-seat cover members 18 cover the upper side of the rear floor panel 14 in the left-right direction from the left side of the left seat rail 16L to the right side of the right seat rail 16R.

Figure 5:
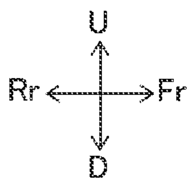
FIG. 5 is a right side view of the vicinity of the rear seat of FIG. 1 as viewed from the right side.
Figure 5:
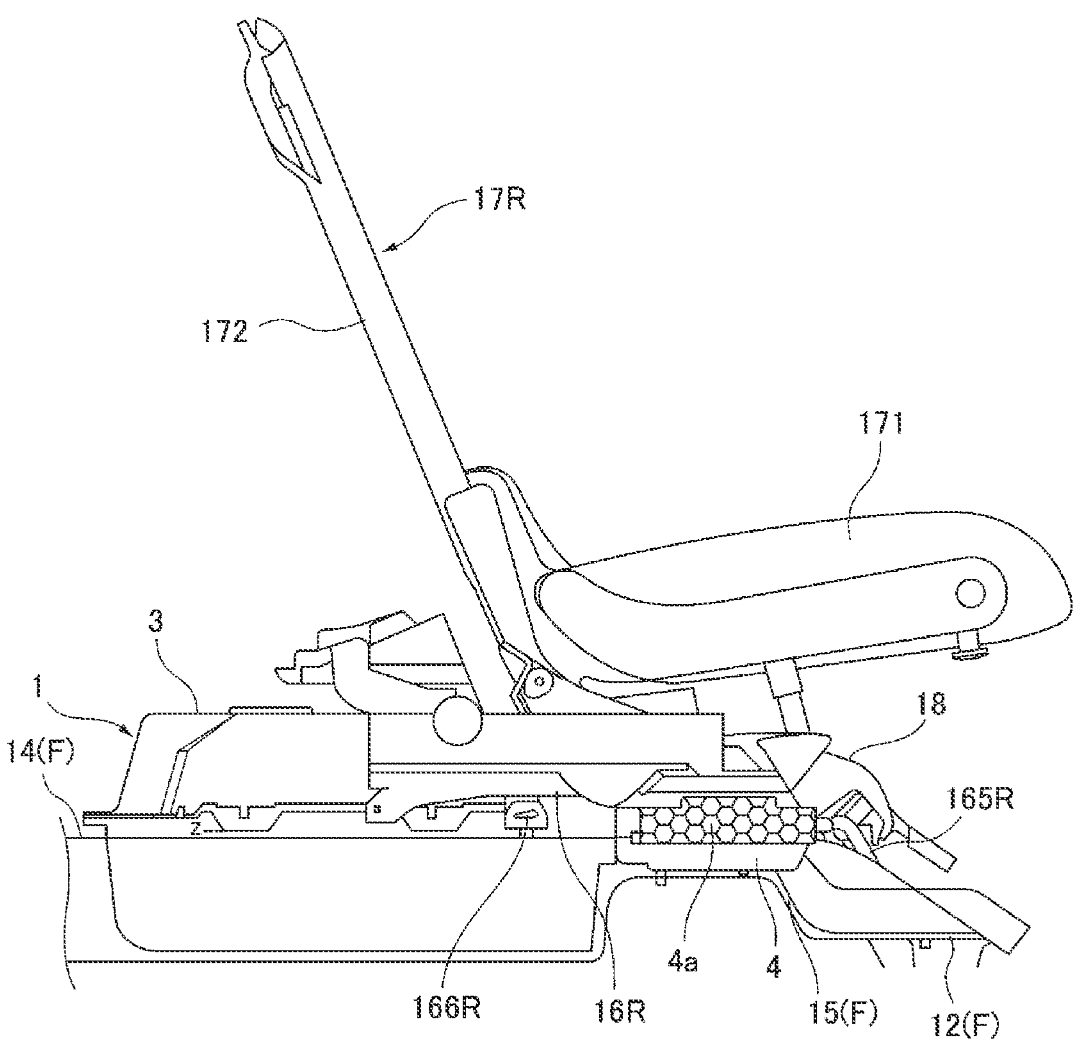

As illustrated in FIG. 5, the right seat rail 16R is fixed to the floor panel F via a front bracket 165R and a rear bracket

166R. The front bracket 165R and the rear bracket 166R are interposed between the right seat rail 16R and the floor panel F.

The front bracket 165R is fixed to the kick-up portion 15 of the floor panel F. The rear bracket 166R is fixed to the rear floor panel 14 of the floor panel F behind the front bracket 165R.

The right seat rail 16R has a front portion fixed to the front bracket 165R by a fixing member such as a bolt, and a rear portion fixed to the rear bracket 166R by a fixing member such as a bolt.

The right seat rail 16R extends in the front-rear direction while being separated upward from the rear floor panel 14 due to the front bracket 165R and the rear bracket 166R. The right seat rail 16R is preferably separated upward from the rear floor panel 14 by 30 [mm] or more.

The intake duct 4 is attached near the right end of the front portion of the battery pack 1. The intake duct 4 is provided inner than the right seat rail 16R in the vehicle width direction. The intake duct 4 has a substantially flat rectangular tubular shape longer in the horizontal direction than in the upper-lower direction. The intake duct 4 includes a front-rear extension portion 41 extending forward from the vicinity of the right end of the front portion of the battery pack 1, and a left-right extension portion 42 bent outward in the vehicle width direction (rightward in the present embodiment) from the front end of the front-rear extension portion 41 and extending outward in the vehicle width direction. The right end of the left-right extension portion 42 is provided with the intake port 4*a* facing outward in the vehicle width direction. The intake port 4*a* is an opening facing outward in the vehicle width direction.

Accordingly, the intake duct 4 can be disposed at a position difficult to be visually recognized by the occupant in the passenger compartment 11, which can improve the appearance. Moreover, it is possible to reduce the risk that the occupant in the passenger compartment 11 steps on the intake duct 4. Further, the flow path length of the air in the intake duct 4 can be shortened, and the pressure loss of the air supplied to the battery pack 1 can be reduced.

Further, the intake port 4*a* is, when viewed from the left-right direction, at least partially positioned between the rear floor panel 14 and the right seat rail 16R in the upper-lower direction.

Since the right seat rail 16R extends in the front-rear direction, foreign matters hardly enter between the rear floor panel 14 and the right seat rail 16R. Accordingly, it is possible to more reliably take in air from the intake port 4*a* from between the rear floor panel 14 and the right seat rail 16R which are separated in the upper-lower direction.

As illustrated in FIG. 5, the under-seat cover member 18 is formed so as not to overlap the intake port 4*a* when viewed from the outer side in the vehicle width direction.

Accordingly, without being hindered by the under-seat cover member 18, it is possible to more reliably take air into the intake port 4*a* from between the rear floor panel 14 and the right seat rail 16R which are separated in the upper-lower direction.

Figure 6:
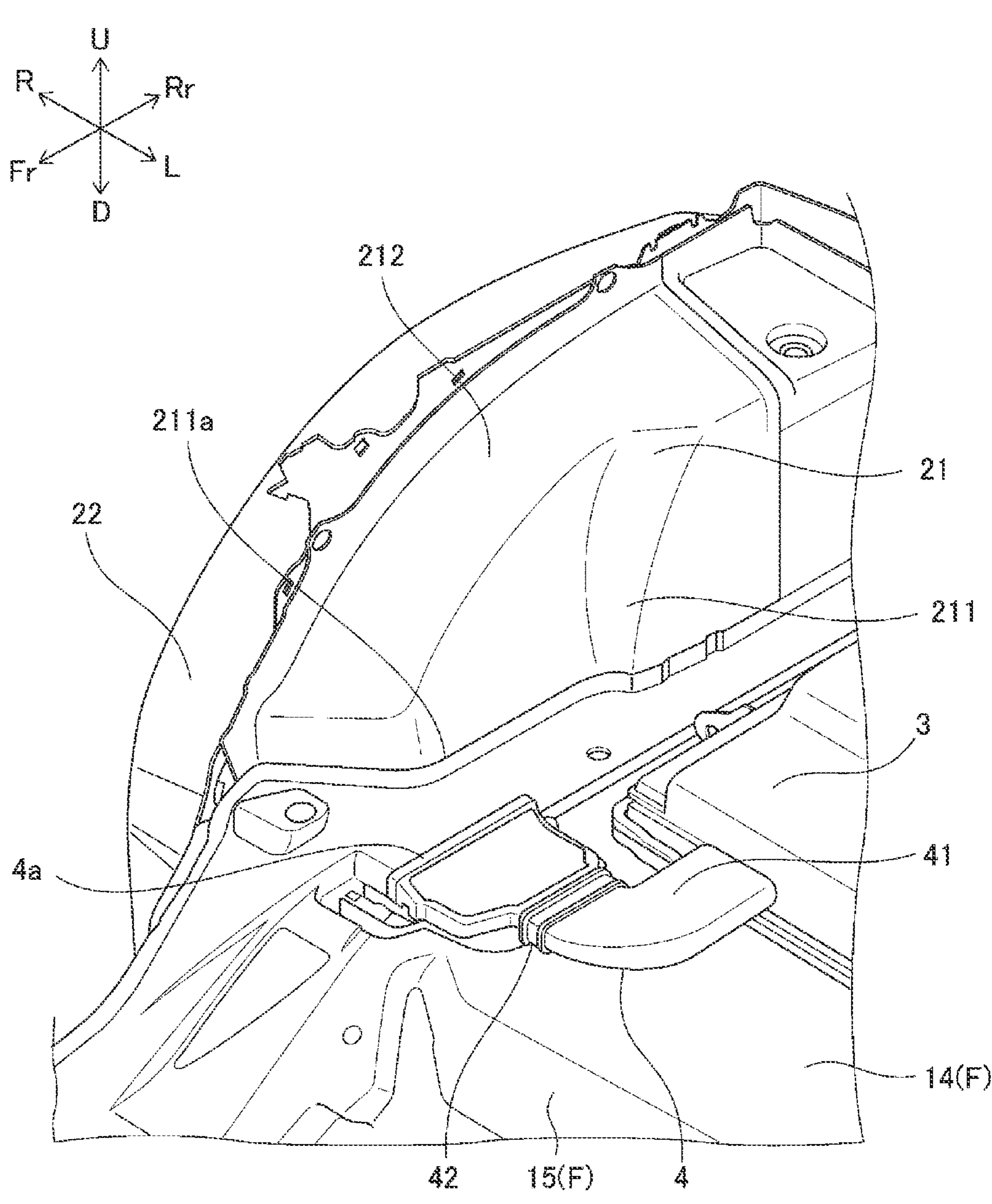
FIG. 6 is a perspective view of the vicinity of a wheel house in FIG. 1.

As illustrated in FIG. 6, the vehicle V includes a pair of left and right rear wheel houses 21 that respectively accommodate the left and right rear wheels. The rear wheel houses 21 extend upward from the rear floor panel 14. Each rear wheel house 21 includes a side wall 211 and a fender 212. The side wall 211 extends upward from the outer end in the vehicle width direction of the rear floor panel 14, faces the inner surface in the vehicle width direction of the rear wheel, and extends in the front-rear direction and the upper-lower direction. The fender 212 is bent outward in the vehicle width direction from the side wall 211, faces the ground contact surface of the upper region of the rear wheel, and extends outward in the vehicle width direction from the side wall 211.

In the present embodiment, at a front end 211*a* of the side wall 211, the fender 212 extends outward in the vehicle width direction from the front end 211*a* of the side wall 211 in a manner curved or inclined forward.

The intake port 4*a* is at least partially disposed in front of the front end 211*a* of the side wall 211 of the rear wheel house 21.

Accordingly, the air flowing rearward from the front in the passenger compartment 11 and hitting the fender 212 is guided inward in the vehicle width direction by the fender 212, thereby introduced into the intake port 4*a*. Accordingly, it is possible to take in more air in the front portion of the passenger compartment 11 cooled by the car air conditioner or the like from the intake port 4*a*.

In this way, it is possible to shorten the flow path length of air in the intake duct 4 and more reliably take in more air in the front portion of the passenger compartment from the intake port 4*a*.

Figure 7:
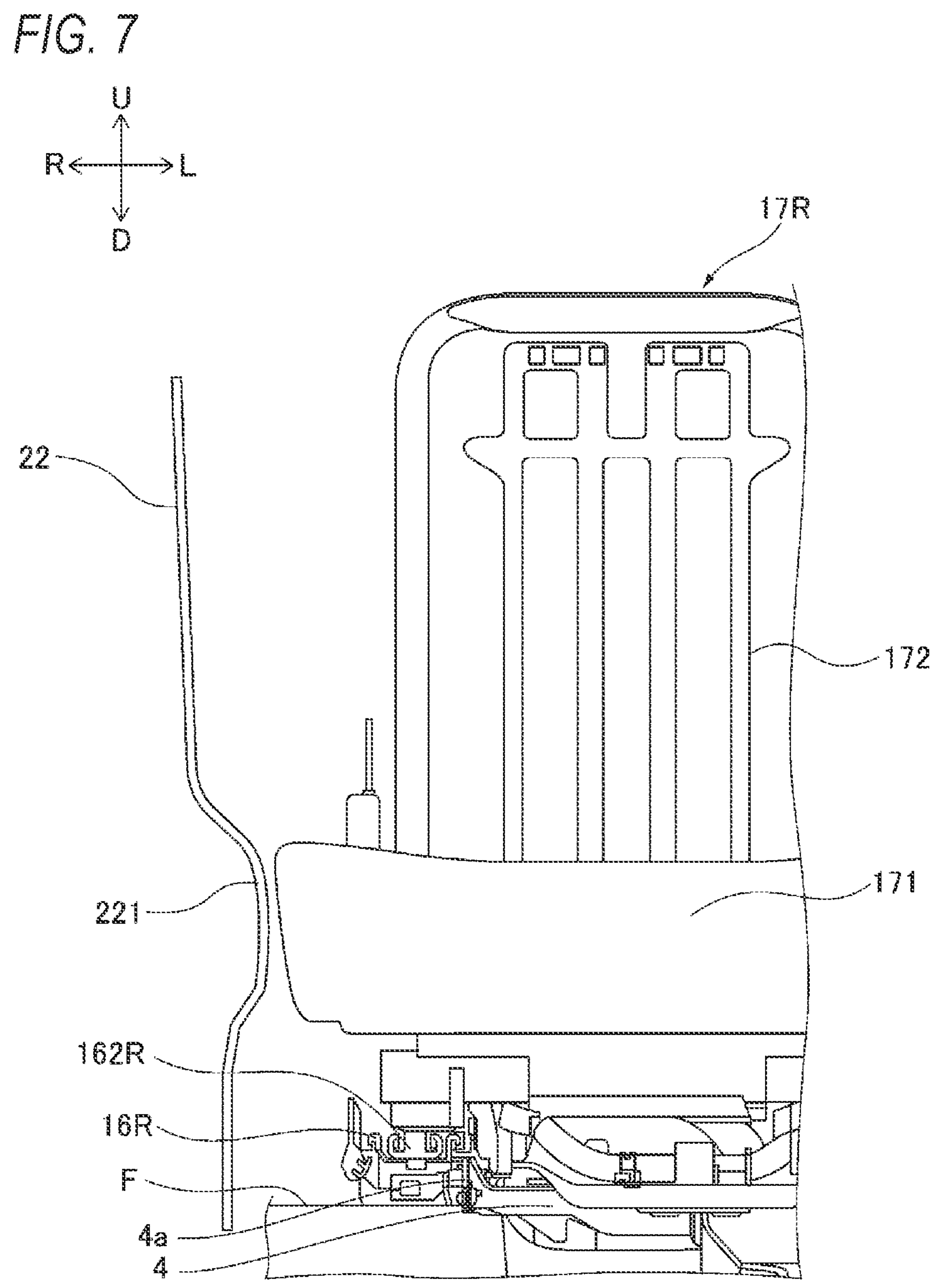
FIG. 7 is a front view of the vicinity of a right rear seat in FIG. 1.

As illustrated in FIGS. 6 and 7, the vehicle V further includes a pair of left and right body side trims 22 extending in the front-rear direction and the upper-lower direction and constituting the inner walls of the side portions of the passenger compartment 11.

The left and right body side trims 22 extend upward from the left and right ends of the floor panel F.

The body side trim 22 is curved or inclined inward in the vehicle width direction toward the rear side along the fender 212 of the front end 211*a* of the side wall 211 of the rear wheel house 21 when viewed in the upper-lower direction. In the present embodiment, at a curved portion 22*a*, the body side trim 22 is curved or inclined inward in the vehicle width direction toward the rear side along the fender 212 of the front end 211*a* of the side wall 211 of the rear wheel house 21.

Accordingly, the air flowing rearward along the body side trim 22 from the front side in the passenger compartment 11 is guided inward in the vehicle width direction by the portion curved or inclined inward in the vehicle width direction toward the rear side of the body side trim 22, thereby introduced into the intake port 4*a*. Accordingly, it is possible to take in more air in the front portion of the passenger compartment 11 cooled by the car air conditioner or the like from the intake port 4*a*.

Further, the body side trim 22 has a recess 221 recessed inward in the vehicle width direction above the intake port 4*a* when viewed in the front-rear direction. Accordingly, a space is formed below the recess 221 when viewed in the front-rear direction.

Accordingly, it is possible to secure a space serving as a flow path for the air in the front portion of the passenger compartment 11 cooled by the car air conditioner or the like, and it is possible to take in more air in the front portion of the passenger compartment 11 cooled by the car air conditioner or the like from the intake port 4*a*.

Furthermore, the recess 221 is provided at a position facing the seating portion 171 of the right rear seat 17R in the left-right direction and is recessed inward in the vehicle width direction so as to approach the seating portion 171.

Accordingly, the seating portion 171 of the right rear seat 17R and the body side trim 22 are close to each other, so that foreign matters can be prevented from entering the space below the recess 221 from between the right rear seat 17R and the body side trim 22. Accordingly, it is possible to more reliably take air into the intake port 4*a* from the space below the recess 221.

Although an embodiment of the present invention has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, the components in the above embodiments may be combined as desired without departing from the gist of the invention.

For example, the present invention is not limited to the rear seat 17, but may be a front seat.

For example, the number of the air intake ports 4*a* is not limited to one, and may be plural.

For example, the left seat rail 16L may be left-right symmetrical to and have substantially the same shape as the right seat rail 16R according to the present embodiment, the intake duct 4 may be provided inner than the left seat rail 16L in the vehicle width direction, and the air intake port 4*a* may face leftward. In this case, the body side trim 22 on the left side of the vehicle V may be symmetrical to and have substantially the same shape as the body side trim 22 on the right side of the vehicle V according to the present embodiment.

In the present description, at least the following matters are described. In the parentheses, the corresponding constituent elements and the like in the above embodiments are illustrated as an example, but the present invention is not limited thereto.

(1) A vehicle (vehicle V) including:

a floor panel (floor panel F) constituting a floor surface of a passenger compartment (passenger compartment 11) and a portion behind the passenger compartment;

a seat rail (right seat rail 16R) attached to the floor panel and extending in a front-rear direction;

a movable member (right movable member 162R) engaged with the seat rail in a manner slidable in the front-rear direction;

a seat (right rear seat 17R) supported by the movable member;

a battery pack (battery pack 1) disposed behind the seat;

an intake duct (intake duct 4) having an intake port (intake port 4*a*) and configured to supply air taken in from the intake port to the battery pack; and a wheel house (rear wheel house 21) extending upward from the floor panel, in which the seat rail extends in the front-rear direction while being separated upward from the floor panel, the intake duct is provided inner than the seat rail in a vehicle width direction, the intake port faces outward in the vehicle width direction, the intake port is, when viewed from a left-right direction, at least partially positioned between the floor panel and the seat rail in an upper-lower direction, the wheel house includes, when viewed in the upper-lower direction, a side wall (side wall 211) extending in the front-rear direction and a fender (fender 212) extending outward in the vehicle width direction from the side wall, and the intake port is at least partially positioned in front of a front end of the side wall of the wheel house.

According to (1), it is possible to shorten the flow path length of air in the intake duct and more reliably take in more air in the front portion of the passenger compartment from the intake port.

(2) The vehicle according to (1), further including:

a body side trim (body side trim 22) extending in the front-rear direction and the upper-lower direction and constituting an inner wall of a side portion of the passenger compartment, in which at a front end (front end 211*a*) of the side wall, the fender of the wheel house extends outward in the vehicle width direction from the front end of the side wall in a manner curved or inclined forward when viewed in the upper-lower direction, and the body side trim is curved or inclined inward in the vehicle width direction toward a rear side along the fender at the front end of the side wall of the wheel house when viewed in the upper-lower direction.

According to (2), the air flowing rearward along the body side trim from the front side in the passenger compartment is guided inward in the vehicle width direction by the portion curved or inclined inward in the vehicle width direction toward the rear side of the body side trim, thereby introduced into the intake port. Accordingly, it is possible to take in more air in the front portion of the passenger compartment cooled by the car air conditioner or the like from the intake port.

(3) The vehicle according to (1) or (2), further including:

a body side trim (body side trim 22) extending in the front-rear direction and the upper-lower direction and constituting an inner wall of a side portion of the passenger compartment, in which the body side trim has a recess (recess 221) recessed inward in the vehicle width direction above the intake port when viewed in the front-rear direction.

According to (3), it is possible to secure a space serving as an air flow path in the front portion of the passenger compartment below the recess, and it is possible to take in more air in the front portion of the passenger compartment cooled by the car air conditioner or the like from the intake port.

(4) The vehicle according to (3), in which the seat includes a seating portion (seating portion 171) extending in the front-rear direction and the left-right direction, and the recess is provided at a position facing the seating portion in the left-right direction and is recessed inward in the vehicle width direction so as to approach the seating portion.

According to (4), the seating portion of the seat and the body side trim are close to each other, so that foreign matters can be prevented from entering the space below the recess from between the seat and the body side trim. Accordingly, it is possible to more reliably take air into the intake port from the space below the recess.

(5) The vehicle according to (1), in which the seat includes a seating portion (seating portion 171) extending in the front-rear direction and the left-right direction, an under-seat cover member (under-seat cover member 18) extending in the front-rear direction and the left-right direction is disposed between the seat rail and the seating portion, and the under-seat cover member is formed so as not to overlap the intake port when viewed from an outer side in the vehicle width direction.

According to (5), without being hindered by the under-seat cover member, it is possible to more reliably take air into the air intake port from between the floor panel and the seat rail which are separated in the upper-lower direction.

What is claimed is:

1. A vehicle comprising:

a floor panel constituting a floor surface of a passenger compartment and a portion behind the passenger compartment;

a seat rail attached to the floor panel and extending in a front-rear direction;

a movable member engaged with the seat rail in a manner slidable in the front-rear direction;

a seat supported by the movable member;

a battery pack disposed behind the seat;

an intake duct having an intake port and configured to supply air taken in from the intake port to the battery pack; and a wheel house extending upward from the floor panel, wherein the seat rail extends in the front-rear direction while being separated upward from the floor panel, the intake duct is provided inner than the seat rail in a vehicle width direction, the intake port faces outward in the vehicle width direction, the intake port is, when viewed from a left-right direction, at least partially positioned between the floor panel and the seat rail in an upper-lower direction, the wheel house includes, when viewed in the upper-lower direction, a side wall extending in the front-rear direction and a fender extending outward in the vehicle width direction from the side wall, and the intake port is at least partially positioned in front of a front end of the side wall of the wheel house.

2. The vehicle according to claim 1, further comprising:

a body side trim extending in the front-rear direction and the upper-lower direction and constituting an inner wall of a side portion of the passenger compartment, wherein at a portion where the fender of the wheel house is provided, the fender constitutes the inner wall of the side portion of the passenger compartment, at a front end of the side wall, the fender of the wheel house extends outward in the vehicle width direction from the front end of the side wall in a manner curved or inclined forward when viewed in the upper-lower direction, and the body side trim is curved or inclined inward in the vehicle width direction rearward along the fender at the front end of the side wall of the wheel house when viewed in the upper-lower direction.

3. The vehicle according to claim 1, further comprising:

a body side trim extending in the front-rear direction and the upper-lower direction and constituting an inner wall of a side portion of the passenger compartment, wherein at a portion where the fender of the wheel house is provided, the fender constitutes the inner wall of the side portion of the passenger compartment, and the body side trim has a recess recessed inward in the vehicle width direction above the intake port when viewed in the front-rear direction.

4. The vehicle according to claim 3, wherein the seat includes a seating portion extending in the front-rear direction and the left-right direction, and the recess is provided at a position facing the seating portion in the left-right direction and is recessed inward in the vehicle width direction so as to approach the seating portion.

5. The vehicle according to claim 1, wherein the seat includes a seating portion extending in the front-rear direction and the left-right direction, an under-seat cover member extending in the front-rear direction and the left-right direction is disposed between the seat rail and the seating portion, and the under-seat cover member is formed so as not to overlap the intake port when viewed from an outer side in the vehicle width direction.

* * * * *